(No Model.)

E. LESLIE.
BREAD TOASTER.

No. 509,916.  Patented Dec. 5, 1893.

Witnesses:
Wm. H. Dopp
Al. Stark

Inventor:
Edwin Leslie
by Michael J. & Wm. O. Stark
Attorneys.

THE NATIONAL LITHOGRAPHING COMPANY,
WASHINGTON, D. C.

UNITED STATES PATENT OFFICE.

EDWIN LESLIE, OF BUFFALO, NEW YORK.

BREAD-TOASTER.

SPECIFICATION forming part of Letters Patent No. 509,916, dated December 5, 1893.

Application filed December 18, 1890. Serial No. 375,064. (No model.)

*To all whom it may concern:*

Be it known that I, EDWIN LESLIE, of Buffalo, in the county of Erie and State of New York, have invented certain new and useful improvements in Bread-Toasters; and I do hereby declare that the following description of my said invention, taken in connection with the accompanying sheet of drawings, forms a full, clear, and exact specification, which will enable others skilled in the art to which it appertains to make and use the same.

This invention has general reference to improvements in bread toasters and broilers; and it consists, essentially, in the novel and peculiar combination of parts and details of construction, as hereinafter first fully set forth and described and then pointed out in the claims.

Figure 1:
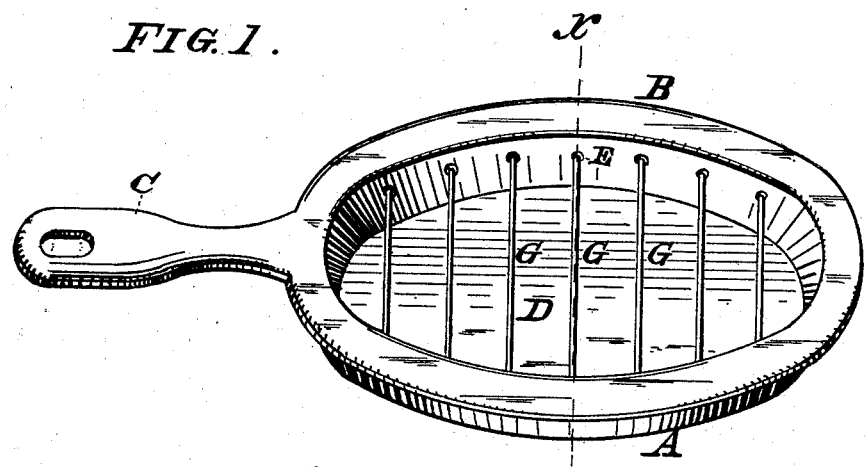
Figure 2:
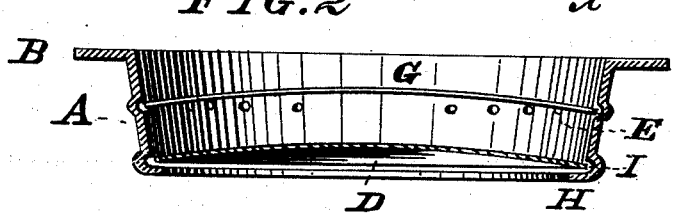
Figure 5:
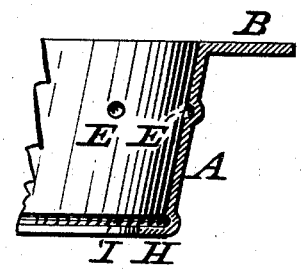
Figure 3:
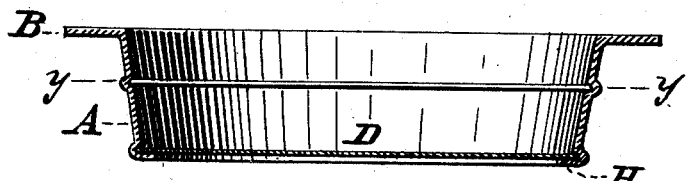
Figure 4:
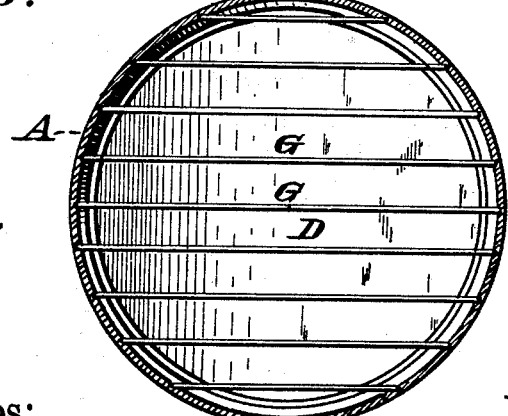

In the drawings already mentioned, which serve to illustrate my said invention more fully, Figure 1 is a perspective view of a bread toaster and broiler, constructed in accordance with my said invention. Fig. 2 is a transverse sectional elevation, in line $x\ x$ of Fig. 1 illustrating the device with its bottom and cross-bars in position ready for attachment to the rim; and Fig. 3 is a similar view with these parts properly secured. Fig. 4 is a sectional view in line $y\ y$ of Fig. 2. Fig. 5 is a fragmental sectional view of the rim on a larger scale.

Like parts are designated by corresponding letters of reference in all the figures.

The object of this invention is the production of an efficient, cheap, and serviceable bread toaster and broiler, which shall be capable of being readily manufactured and sold at a reasonable figure, and which can especially be used in connection with natural gas, artificial gas, gasoline, and oil stoves, where the bread to be toasted cannot be brought in direct contact with or near the flame. To accomplish these results, I construct this bread toaster or broiler of a pan-shaped receptacle or structure having a non-perforated bottom, and above this bottom a wire or other rod-support to carry the bread or other article of food to be toasted or broiled, the pan having preferably a laterally-projecting flange on its upper end by means of which it is supported within the openings in the top-plates of a stove or range, and a handle by which it may be properly manipulated.

Many ways may be devised in which this invention can be carried into effect, and I shall now proceed to describe the preferred methods in which I propose to carry it out.

When the process of casting is desired to be employed, I construct the bread toaster substantially of an annular rim A, having on its upper edge a laterally-projecting flange B, and a conveniently formed handle C. Above the bottom D of this annular rim, and in the interior thereof, is formed a series of cup-shaped depressions E, into which wires G are passed in any suitable manner and upon which the bread or other article of food is placed to be broiled or toasted. These articles of food are properly cooked by the heat emitted or radiated by the bottom D, which when the device is in use, becomes red hot and therefore capable of properly roasting the article of food, it being understood that to enable this bottom D to become properly heated, it should be as thin as is consistent with the nature of the material employed. In practice, I have found that very thin sheet iron is most suitable and, in order to enable me to use such a sheet iron bottom in conjunction with a cast iron rim A, I provide the cast iron rim with an inwardly-projecting flange H, on its lower end as illustrated in Fig. 3, and place the sheet iron bottom D upon this flange or ledge, the wires G above this bottom preventing its removal from its proper place. This construction is at once cheap and efficient and capable of producing my device at the lowest possible cost, while when the bottom should in course of time, burn through, it can be readily removed and replaced by removing the wires G and replacing them after the bottom has been renewed. To prevent this bottom D from moving in the rim A, I may form a groove I, in the lower inner end of the rim A, as shown in Fig. 5, and form the sheet iron bottom dished, as illustrated in Fig. 2, and after placing it into the said groove, flatten it more or less, thereby increasing its diameter and preventing it from leaving said groove I as shown in Fig. 3. This rim A may also be produced in malleable iron and, instead of locating wires in it, their substitute, viz., bars, may be cast in the rim and the bottom introduced into the groove from the lower end of the rim A, and then securing it therein, in the manner heretofore described. The wires G may be sprung into the cup-shaped depressions by slightly curving them, as shown in Fig. 2, and then straightening them, as shown in Fig. 3. This straightening has the effect of slightly lengthening these wires and thereby preventing them from falling out of the depressions in the rim, still not enough so as not to interfere with their removal when desired for cleaning the toaster or for other obvious purposes.

It is evident that in the construction of the device sheet metal may be employed for the rim, since the cup-shaped depressions and the groove I can be readily produced therein in a well-known manner.

It will now be observed that this bread toaster differs from others with which I am acquainted in the following: It is constructed of circular form and provided with a lateral flange by means of which it rests upon the top-plate of a stove or range, so that its body-portion projects downwardly into the hearth or fire-chamber of such range, and so that the bottom of the utensil is nearly or quite in contact with the fire, be it from coal, wood, gas or other natural or artificial fuel, thereby enabling the bottom to become red hot without allowing the food-article to be roasted to come in direct contact with the fire and partake of, or be tainted with, the disagreeable flavor of the gases of combustion with which the said article would otherwise come in contact.

It will be readily seen that the construction of this kitchen utensil is at once cheap and efficient and that the nature of the same is such as to be easily produced by present methods of manufacture in either cast or sheet iron or sheet steel, requiring no special tools, machines, or implements for its manufacture beyond those now possessed by establishments producing analogous devices.

Having thus fully described my invention, I claim as new and desire to secure to me by Letters Patent of the United States—

1. An improved bread-toaster, consisting of an annular rim having a handle; cup-shaped depressions in said rim; cross wires in said depressions; an annular groove near the inner lower edge of the rim, and a bottom inserted in said groove, in the manner as and for the object stated.

2. In a bread-toaster, the hereinbefore-described rim having at its upper end a laterally-projecting flange provided with a handle; a series of cup-shaped depressions within this rim and an annular groove at the lower end, said depressions being adapted to receive wires and the groove to retain a bottom, as and for the object stated.

In testimony that I claim the foregoing as my invention I have hereto set my hand in the presence of two subscribing witnesses.

EDWIN LESLIE.

Witnesses:
MICHAEL J. STARK,
WM. O. STARK.